United States Patent

[11] 3,549,780

[72] Inventors Peter Graneau
Concord;
Sayfollah Bijan Afshartous, Jamaica Plain, Mass.
[21] Appl. No. 791,384
[22] Filed Jan. 15, 1969
[45] Patented Dec. 22, 1970
[73] Assignee Simplex Wire and Cable Company
Cambridge, Mass.
a corporation of Massachusetts

[54] CONTRACTION JOINT
4 Claims, 2 Drawing Figs.

[52] U.S. Cl. ........................................ 174/21,
174/12, 174/86; 285/299
[51] Int. Cl. ........................................ H02g 15/24;
F16l 27/12

[50] Field of Search ............................ 174/86,
21.4, 21, 13, 12; 138/26, 28; 285/299, 300, 226, 228

[56] References Cited
UNITED STATES PATENTS
1,702,066 2/1929 Valentine ................. 285/99
3,068,026 12/1962 McKamey ................. 285/300X Primary Examiner—Darrell L. Clay
Attorney—McLean, Morton and Boustead ABSTRACT: A contraction joint for tubular electric conductors employed in a high voltage transmission cable typically cooled by internal passage of refrigerant, such as liquid nitrogen, and insulated by a high vacuum.

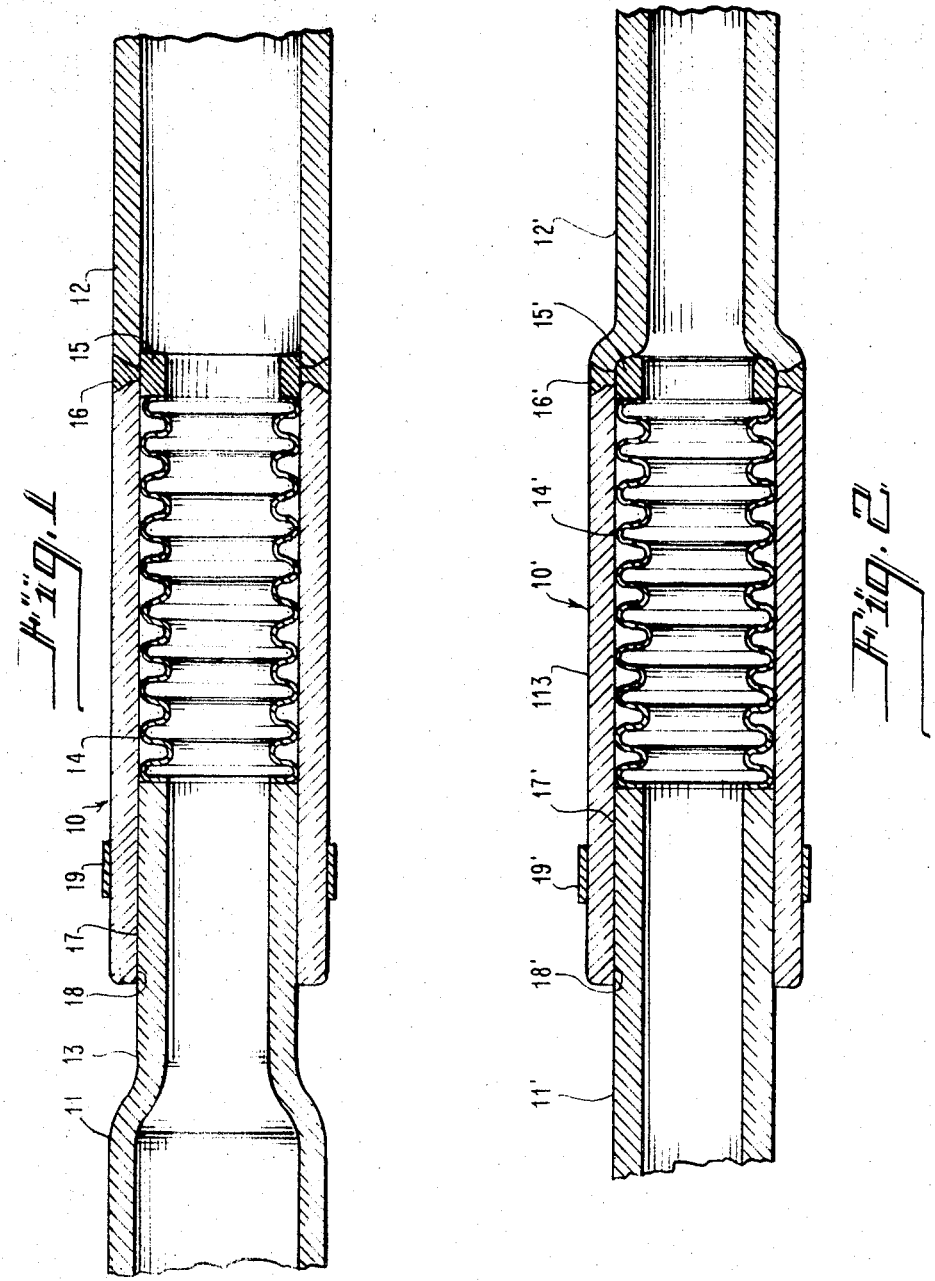

CONTRACTION JOINT

This invention relates to the transmission of electric power and in particular provides a contraction joint construction suitable for tubular conductors insulated by high vacuum and cooled by passage therethrough of a refrigerant, such as liquid nitrogen.

In the design and construction of electric cables for high voltage power transmission, using high vacuum insulation, it is necessary to provide a refrigeration system for extracting Joule heating losses along the conductors, as no other means for efficient dissipation of such heating losses exists. While a number of materials have been suggested as refrigerants, the refrigerant of choice in a high vacuum insulated cable is liquid nitrogen operated at pressures on the order of 10 to 20 atmospheres and at temperatures on the order of 65° to 100° Kelvin.

Since in a high voltage cable insulated by high vacuum the conductor, as a practical matter, must be rigid, the temperature extremes to which the conductor is subjected render desirable the employment of a device to accommodate the contraction which occurs in the conductor after installation when the cable is put into service. Such a contraction device normally takes the form of a joint in the conductor at which the conductor is free to contract on cooling to operating temperature after installation.

Since vacuum insulated high voltage cables are generally limited to the transmission of large volumes of power at voltage levels of the order of one hundred kilovolts or more and since the conductors of such a cable must internally carry refrigerant under moderate pressure, as indicated above, design of such contraction joint must satisfy certain criteria imposed by these limitations. The external contour of the joint must be free of sharp corners and the like tending to produce corona. The external shape of the joint must be of limited variation from that of the tubular conductor in order not to provide a restriction in the transverse dimensions of the evacuated insulating space where a greater tendency to high voltage breakdown might occur. Internally the joint must be fluidtight at the working pressures of the refrigerant utilized while at the same time providing a minimal obstruction to the flow of refrigerant through the joint. Moreover, the joint must be capable of passing electric current on the order of a thousand or more amperes without substantial voltage drop.

In accordance with the present invention, a contraction joint is provided meeting these criteria and having particular applicability to tubular conductors formed of aluminum, which, although it is the conductor metal of choice for high vacuum insulated cable, is not as readily joint electrically as copper, for example.

The contraction joint of the present invention basically provides for a joint between two adjacent tubular conductors which are designed such that the end of one is slidably received in the end of the other. Preferably the interiorally received tubular end is necked down such that the joined conductors have uniform external transverse dimensions along most of the length of the joint. Alternatively, one conductor end can be expanded slidably to receive the end of the other conductor interiorally. The interiorally received conductor end is longitudinally extensible, e.g., it can have a bellows extension, and is affixed interiorally to the other conductor in which it is received such that it is in fluidtight connection with the interior of the conductor. Thus the two conductor sections are mounted together in a dry, sliding fit such that after installation when the conductors are filled with refrigerant, such as liquid nitrogen, and are brought down to operating temperatures, the substantial contraction which takes place can be accommodated by sliding of one conductor section over the other section and by extension of the bellows or other extensible end on the inner conductor section. Since at one end the bellows is in fluidtight connection with the inner conductor section and at its other end is in connection with the outer conductor section and is so located within the outer conductor section as to seal the sliding joint between the conductor sections, flow of refrigerant is permitted through the joint without loss of refrigerant.

For a better understanding of this invention, reference is made to the appended drawing in which:

FIG. 1 is a longitudinal section of a contraction joint in accordance with this invention; and FIG. 2 is a similar longitudinal section of another contraction joint in accordance with this invention.

Referring to FIG. 1, the reference numeral 10 designates a contraction joint in accordance with this invention for joining adjacent ends of a pair of tubular aluminum conductor sections 11 and 12. Conductor sections 11 and 12 are of suitable construction for confining a refrigerant, such as liquid nitrogen, flowing through them at temperatures on the order of 65° to 100° Kelvin, and at pressures on the order of 10 to 20 atmospheres. In practice, conductor sections 11 and 12 are part of a conductor which is supported in an evacuated enclosure, for example, as described in Graneau application Ser. No. 727,993, filed May 9, 1968, and which is used in the transmission of bulk electric power at high voltages, for example, 1,000 or 2,000 amperes at 200 kv. to 400 kv.

Joint 10 is designed primarily to accommodate the contraction which takes place in conductor sections 11 and 12 after installation when they are initially brought to operating temperature, for example, 65° K. prior to being put into service. Typically, conductors 11 and 12 are tubular sections having lengths on the order of 30 to 100 feet. Depending upon the design of the particular installation, upon cooling from ambient temperatures on the order of 300° K. to operating temperatures on the order of 65° K., each section 11 and 12 will contract two to six inches to accommodate the temperature change.

In accordance with the present invention as shown in FIG. 1, the end of a conductor section 11 to be joined to an end of a conductor section 12 is necked down as indicated at portion 13 to be slidably but tightly received within the end of section 12. The length of necked-down portion 13 which is received within conductor section 12 is sufficiently greater than the contemplated contraction to be accommodated to provide a substantial safety factor in the event that joint 10 may be required to accommodate not only the contraction of its immediated associated conductor sections 11 and 12 but in part that of other conductor sections in the event of unequal distribution of contraction among the joint along the conductor.

The necked-down end portion 13 of conductor section 11 terminates in an extensible tube 14 formed of the same or another material as conductor sections 11 and 12, for example, aluminum or stainless steel. Extensible tube 14 can be formed integrally with the end of conductor section 11 by forming corrugations, for example, by magnetic swaging. Preferably, however, extensible tube 14 is formed separately and is a bellows type construction. Bellows extension 14 is butted against the necked-down portion 13 of conductor section 11 to which it is welded to form a fluidtight seal about their butted ends, such that tube 14 extends coaxially with conductor section 11 having outside dimensions approximating those of necked-down portion 13.

In assembled joint 10 at ambient temperatures neckeddown portion 13 and extensible tube 14 are positioned almost entirely within the end of conductor section 12. The end of extensible tube 14 remote from conductor section 11 carries a ring 15 which fits securely within conductor section 12 and which is secured to conductor section 12 with a fluidtight seal, for example, by braising, electro slag welding or other methods. It is important that the welded indicated by the reference numeral 16 extend entirely about ring 15 in order to ensure a fluidtight seal such that the internal passage between conductor sections 11 and 12 through joint 10 including extensible tube 14 is entirely fluidtight at the working conditions to be encountered. In practice, extensible tube 14 is formed on the end of conductor section 11 as part of the manufacturing operation, while weld 16 is made in the field at the time of installation of the cable which includes conductor sections 11 and 12.

As indicated above, the fit between conductor sections 11 and 12 is tight but slidable. The sliding contacting surfaces 17 and 18 of sections 11 and 12, respectively, must carry the current flow through the conductor of which sections 11 and 12 form adjoining parts after installation. When refrigerant is circulated through the center of conductor sections 11 and 12 and, hence, through the center of tube 14, the contraction of sections 11 and 12 which takes place, as these parts cool to operating temperatures, reduces the total area of contact between surfaces 17 and 18 because of the partial withdrawal of the end of conductor section 12 from necked portion 13 of conductor 11, which, it should be noted, is accommodated by a concommitant expansion of tube 14. Consequently, in designing sections 11 and 12, it is important that the areas of contact 17 and 18 at operating temperature be carefully designed to have as low a resistance as possible, in order that excessive energy loss in resistance heating at contacting surfaces 17 and 18 not take place. One manner of reducing the resistance of joint 10 at surfaces 17 and 18 is to maximize their overlapping length at operating temperature. In addition, the pressure of contact should be as great as consistent with the necessary sliding required to accommodate contraction. The pressure can be increased at operating temperatures by applying a strap or a clamp 19 about the end of section 12 overlying areas 17 and 18 which is formed of a material having a greater thermal coefficient of expansion than the conductor material, such that as conductor sections 11 and 12 cool to operating temperatures the pressure on their sliding surfaces 17 and 18 is increased by the greater contraction of strap 19. Strap 19 can, for example, be made of zinc, when conductor sections 11 and 12 are aluminum.

The joint 10 shown in FIG. 1 is the preferred joint consistent with obtaining a uniform exterior surface of the conductor. This is desirable in order that there not be portions of the conductor of which sections 11 and 12 are part which lie closer to the enclosing conduit or pipe, which would constitute electrical weak points in the vacuum insulator. It will be noted, however, that the design does produce a restriction of the flow path for the refrigerant which is undesirable when the length of the conductor becomes such that the pressure drop along the flow path of the refrigerant becomes critical. An alternate design for a joint indicated by the reference numeral 10' between a pair of adjacent conductor sections 11' and 12' is shown in FIG. 2 which reduces the pressure drop but which has the disadvantage of providing an external enlargement at the joint. This arrangement is permissible when the joint 10' is caused to lie between conductor supports and such an external enlargement is permissible. In joint 10' and joint 10 functionally the same components are provided these being indicated in FIG. 2 by the same reference numerals as are utilized in FIG. 1, except that the superscript prime is added. In joint 10', however, conductor section 11' does not include a necked-down portion 13, but rather tube 14' which is attached to the end of section 11' and has the same general transverse dimensions as sections 11' and 12'. In addition, the end of conductor section 12' which overlies tube 14' and section 11' is slightly expanded to form a bell 113 in which the end of section 11' and tube 14' are received. As will be apparent from FIG. 2, this alternative design permits fluid flow through joint 10' without substantial restriction and, hence, minimizes pressure drop of refrigerant flowing through joint 10'.

We claim:

1. In a contraction joint in a conductor in which said conductor includes a pair of adjacent tubular conductor sections, the improvement which includes second said section having an end thereof positioned slidably over an end of the first said section in electrical, slidable contact therewith, said end of said first section terminating in an extensible tubular portion, fluidtight sealing means joining said tubular portion to the inside of said second conductor section whereby upon cooling of said sections and joint the contraction which takes place is accommodated by partial withdrawal of said end of said first section from said end of said second section and by extension of said portion in said second section.

2. The improvement according to claim 1 in which said extensible tubular portion is corrugated.

3. The improvement according to claim 1 in which said end of said first section is necked-down to be received in said second section.

4. The improvement according to claim 1 in which a clamp is positioned about said end of said second section overlying said sliding contact thereof with said first section, said clamp having a greater coefficient of thermal expansion than said first and second sections.